Oct. 17, 1939.   H. T. RYGAARD   2,176,613
CARTON-FILLING TRAY
Filed June 6, 1938

INVENTOR.
Hans T. Rygaard
BY
Hovey Hamilton
ATTORNEYS

Patented Oct. 17, 1939

2,176,613

UNITED STATES PATENT OFFICE 2,176,613

CARTON-FILLING TRAY

Hans T. Rygaard, Atchison, Kans., assignor of one-half to Ernest Hazel, Jr., Atchison, Kans.

Application June 6, 1938, Serial No. 212,098

6 Claims. (Cl. 226—93)

This invention relates to carton filling equipment and particularly to a portable, sectional filling tray for use by vendors of ice cream and similar products.

The primary object is to provide such a tray with means for positively and effectively holding a plurality of cartons in condition to quickly receive ice cream or the like, and so that said cartons will not have forced therebetween a quantity of ice cream or the like, which would be wasted and which would likewise bend the sides of the cartons in such fashion as to render them below capacity after the filling operation has been completed.

One of the important aims of this invention is to provide a carton filling tray with means for drawing together a plurality of cartons so that the same are held as a unit, free of undesirable spaces into which the ice cream or other products, may escape during the operation of loading the plurality of cartons confined within the filling tray.

Another object of this invention is to provide a filling tray for ice cream cartons or the like, which has a pan equipped with upwardly and outwardly flared end and side walls, which pan serves to hold the lower portion of the cartons to be filled, and a frame fashioned to circumscribe the upper portions of the cartons and to compress together the side walls therefor, so as to eliminate the possibility of ice cream or the like, to enter between the cartons as the filling operation takes place.

A yet further aim of the present invention is to provide means for holding a plurality of cartons during the period of filling, which means prevents the side walls of the carton from bulging or changing position to the end that cartons of a given capacity will receive the desired given quantity of ice cream, or the like, thereby not only assuring uniformity as to size and appearance, but similarity as to weight.

It is well-known in this art that the over-run of ice cream must be preserved during the packaging operation, and ice cream manufacturers and handlers recognize that transferring the ice cream from one vessel to another will often times destroy the over-run and will thereby create a commodity which is not uniform throughout a number of small packages which are used to contain a certain batch of ice cream.

The carton filling tray embodying this invention, permits transferring of the ice cream directly from the machine to the upper portion of the tray itself, and when the contents of the mixing machine is once dumped into the tray forming this invention, the single operation is sufficient to package a certain batch of ice cream and assure a uniform product throughout all of the packages or cartons which are held by the tray during one operation.

Details of construction form one of the most important aims of this invention, and minor objects will appear during the course of the following specification wherein.

Figure 1:
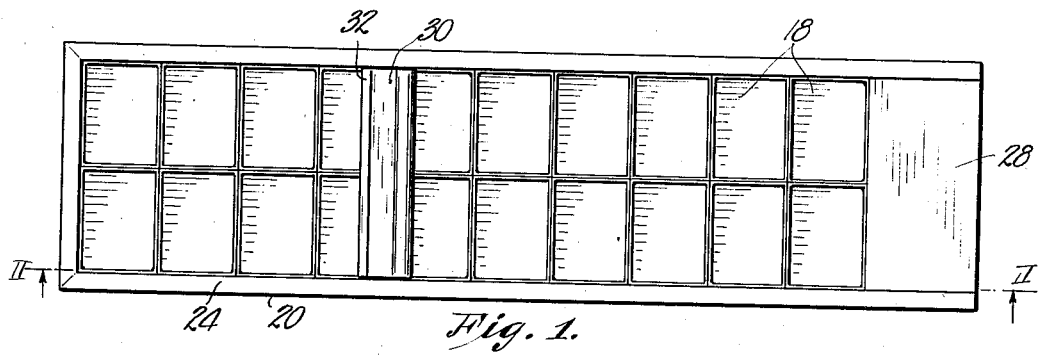
Figure 1 is a top plan view of a carton filling tray made in accordance with the present invention.

In constructing the carton filling tray to embody the preferred form of the invention, as illustrated in the accompanying drawing, any suitable material such as sheet metal may be used, and the size of the tray depends upon the capacity of the cartons which are to be filled. The illustrated embodiment of this invention indicates the manner of filling a number of cartons which are of a one pint capacity, and when the tray is used as shown, 2½ gallons of ice cream are packed into individual one pint cartons at one operation.

The tray is made of two major sections, one of which is pan 8 that comprises a bottom 10, end walls 12, and side walls 14. The free edges of walls 12 and 14 are provided with outwardly extending flanges 16, and the marginal edges of end walls 12 and side walls 14, are flared outwardly from a point beginning about two thirds of their distance above their point of juncture with bottom 10. Pan 8 therefore, is of simple construction but must be made with regard to the sizes of cartons 18 which are to be packed. Pan 8 is rectangular so that when cartons 18 are placed in side by side relation to snugly fit into the pan and the flared marginal edges of walls 12 and 14 assist in the introduction of the empty cartons at the beginning of the filling operation.

The other section of the filling tray is a circumscribed element or frame like member 20, one edge of which is in register with the edges of pan 8 and the flanges 16 thereof, when the parts are in position as shown in the drawing.

Frame 20 has a flange 22 integral with one edge thereof, and a flange 24 integral with the other edge thereof. The sides of frame 20 are flared downwardly and outwardly as at 26 so that as the frame is placed in circumscribing relation with the plurality of cartons 18, it will draw the sides of the cartons snugly together to eliminate any spaces that might have a tendency to be present therebetween.

One end of frame 20 has a longitudinally extending lip 28 provided thereon, and this lip is in substantially the same plane as the upper edges of cartons 18 when the tray is ready for the ice cream to be dumped onto the empty cartons and within the confines of frame 20. Lip 28 is inclined upwardly as the outer or free edge thereof is approached so that if the tray must be moved from place to place while the filling operation is being performed, any ice cream resting within frame 20 will have a tendency to be held above the cartons 18 and not allowed to accidentally flow over lip 28.

Longitudinal edges of frame 20 above lip 28 are extended outwardly along two opposite sides of the lip, but the end wall of frame 20 above the lip 28 and between the longitudinal edges, is cut away so as to permit the trowel 30 to force surplus ice cream off the free edge of lip 28 during the levelling operation. This trowel or leveller 30, is just long enough to fit snugly between the longitudinal sides of frame 20, and its smoothing edge 32 rides over the upper edges of cartons 18 and along the upper face of lip 28 so as to discharge from frame 20 any surplus ice cream.

It is obvious from the foregoing that frame 20 is rectangular so that one edge will precisely register with the upper edge of pan 8.

When cartons 18 are moved to position in pan 8 the flaps 34 thereof are bent down along the side walls so that the flaps are confined either between adjacent cartons or between a carton and the pan and frame when the latter are together, thus when the filling operation is completed and frame 20 is lifted from its operative position, cartons 18 may be quickly taken from pan 8 whereupon flaps 34 may be bent to a position where the individual carton is closed. No objectionable collection of ice cream therefore, is on the flaps 34 and the clean, finished carton is made ready for disposal in the hardening room prior to sale.

Figure 2:
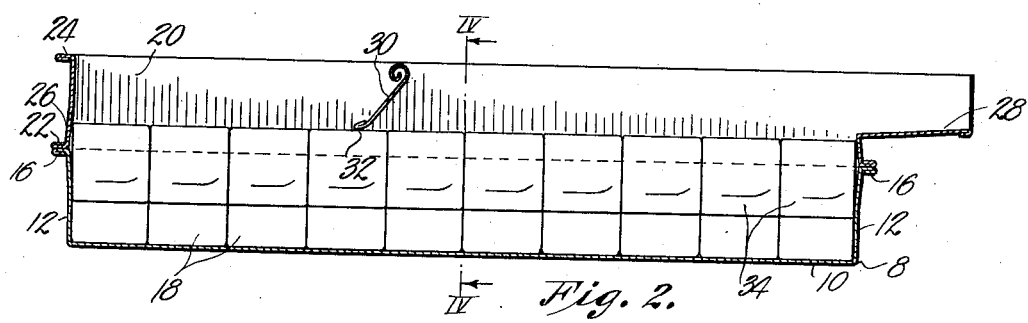
Fig. 2 is a longitudinal sectional view through the same, taken on line II—II of Fig. 1.
Figure 3:
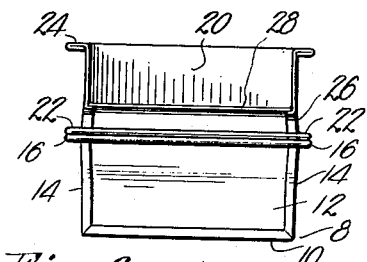
Fig. 3 is an end elevation of the same.
Figure 4:
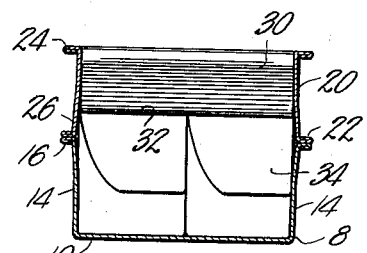
Fig. 4 is a transverse cross-sectional view, through the filling tray taken on line IV—IV of Fig. 2; and, Fig. 5 is an enlarged perspective view of one of the cartons entirely removed from association with the tray.
Figure 5:
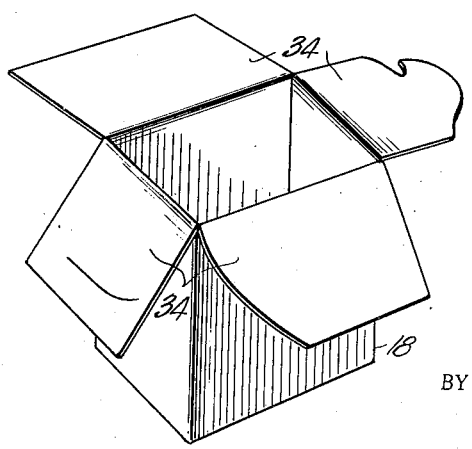

The relation between height of carton 18 and width of pan and frame 8 and 20 respectively, should be maintained, for it is desirable that a portion of the cartons be circumscribed by the frame when the tray and cartons are in the position illustrated in Fig. 2.

Obviously, such changes and modifications might be made in constructing a carton filling tray as are contemplated by the invention, and included in the scope of the appended claims.

Having thus described the invention, what is claimed as new and desired to be secured by Letters Patent is:

1. A tray of the character described, comprising a pan having a bottom, end walls and side walls adapted to hold a plurality of cartons in side by side relation with portions thereof extending outwardly from the pan and beyond the free edges of said end walls and said side walls; and a frame circumscribing the outwardly extending portions of said cartons as a unit, said frame having one edge contiguous with the edge of said tray and having the inner faces of the sides thereof inclined inwardly and upwardly to press together the outwardly extending portions of said cartons when in the operative position.

2. A tray of the character described, comprising a pan having a bottom, end walls and side walls adapted to hold a plurality of cartons in side by side relation, with portions thereof extending outwardly from the pan and beyond the free edges of said end walls and said side walls; a frame circumscribing the outwardly extending portions of said cartons as a unit; and a laterally projecting lip on the frame, said lip being on substantially the same plane as the projected ends of the cartons and extending a substantial distance outwardly from the said pan and frame for the purpose specified.

3. A tray of the character described, comprising a pan having a bottom, end walls and side walls adapted to hold a plurality of cartons in side by side relation, with portions thereof extending outwardly from the pan and beyond the free edges of said end walls and said side walls; a frame, having upwardly and inwardly extending walls circumscribing the outwardly extending portions of said cartons to compress the same as a unit; and a laterally projecting lip on the frame, said lip being on substantially the same plane as the projected ends of the cartons for the purpose specified, said lip being inclined upwardly and outwardly from a transverse line extending across the frame at a point spaced inwardly from one end of the frame, said frame being open between the longitudinal sides and above said lip.

4. A tray of the character described, comprising a pan having a bottom, end walls and side walls adapted to hold a plurality of cartons in side by side relation with portions thereof extending outwardly from the pan and beyond the free edges of said end walls and said side walls; and a frame circumscribing the outwardly extending portions of said cartons as a unit, said pan and said frame being in edge-to-edge relation when in the operative position, said frame being flared outwardly at the edge engaging said pan.

5. A tray of the character described, comprising a pan having a bottom, end walls and side walls adapted to hold a plurality of cartons in side-by-side relation with portions thereof extending outwardly from the pan and beyond the free edges of said end walls and said side walls; and a frame circumscribing the outwardly extending portions of said cartons as a unit, said pan and said frame being in edge-to-edge relation when in the operative position, said frame and said end and side walls of the pan being flared outwardly at the abutting edges thereof.

6. A tray of the character described, comprising a rectangular pan having a bottom, end walls and side walls adapted to hold a plurality of cartons in side-by-side relation with portions thereof extending outwardly from the pan and beyond the free edges of said end walls and said side walls; a rectangular frame of a size to register with the said walls of the pan and to abut the free edges of the said walls when said pan and the frame are in the operative position; and a longitudinally extending lip projecting outwardly from one end of the frame beyond one end of said pan, the longitudinal sides of said frame extending beyond said one end of the frame along the length of said lip, the said end walls and said side walls being flared upwardly and outwardly at their marginal edges to facilitate introduction of the cartons into the pan, said frame being flared downwardly and outwardly at the edge thereof abutting the said end walls and said side walls whereby to press together said cartons as a unit when the frame is moved to position in circumscribing relation with the projected portion of said cartons.

HANS T. RYGAARD.